US006622840B2

United States Patent
Dau et al.

(10) Patent No.: US 6,622,840 B2
(45) Date of Patent: *Sep. 23, 2003

(54) DOUBLE CLUTCH ASSEMBLY (75) Inventors: Andreas Dau, Würzburg (DE);
Andreas Orlamünder, Schweinfurt (DE); Reinhard Feldhaus, Ebenhausen (DE); Jörg Randow, deceased, late of Stammheim (DE), by Anke Randow, heir; Gerhard Röll, Eisenheim (DE); Bernhard Schierling, Kürnach (DE); Michael Peterseim, Bergrheinfeld (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/825,961

(22) Filed: Apr. 4, 2001

(65) Prior Publication Data

US 2001/0025760 A1 Oct. 4, 2001

(30) Foreign Application Priority Data

Apr. 4, 2000 (DE) .......................... 100 16 604

(51) Int. Cl.⁷ .............................. F16D 21/02
(52) U.S. Cl. ................ 192/48.91; 192/70.25; 192/89.23
(58) Field of Search ............... 192/48.8, 48.9, 192/48.91, 70.25, 89.23, 109 A, 111 A (56) References Cited

U.S. PATENT DOCUMENTS

| | | | | | |
|---|---|---|---|---|---|
| 4,238,019 A | * | 12/1980 | Maucher et al. | ........... | 192/48.8 |
| 4,741,227 A | * | 5/1988 | Yamada et al. | ............. | 188/290 |
| 4,787,492 A | * | 11/1988 | Ball et al. | .................. | 192/48.8 |
| 4,836,351 A | * | 6/1989 | Janiszewski | ............. | 192/48.91 |
| 4,889,217 A | * | 12/1989 | Janiszewski et al. | ..... | 192/48.91 |
| 5,984,067 A | * | 11/1999 | Weidinger et al. | ....... | 192/111 A |
| 6,276,504 B1 | * | 8/2001 | Tscheplak et al. | ......... | 192/48.8 |

FOREIGN PATENT DOCUMENTS

| | | | | | |
|---|---|---|---|---|---|
| GB | 2207965 A | * | 2/1989 | ........... | F16D/13/56 |
| JP | 04302715 A | * | 10/1992 | ........... | F16D/23/12 |

* cited by examiner

Primary Examiner—Richard M. Lorence
Assistant Examiner—Dennis Abdelnour
(74) Attorney, Agent, or Firm—Cohen, Pontani, Lieberman & Pavane (57) ABSTRACT A double clutch assembly comprising a first clutch area for the optional production of a torque-transmitting connection between a drive element and a first driven element, a second clutch area for the optional production of a torque-transmitting connection between the drive element and a second driven element, and a common engaging/disengaging mechanism, by means of which the first clutch area and the second clutch area can be actuated to produce or to nullify the torque-transmitting condition.

16 Claims, 7 Drawing Sheets

DOUBLE CLUTCH ASSEMBLY

BACKGROUND OF THE INVENTION

1. Field of the Invention

The present invention pertains to a double clutch assembly, comprising a first clutch area for the optional production of a first torque-transmitting connection between a drive element and a first driven element, and a second clutch area for the optional production of a second torque-transmitting connection between the drive element and a second driven element.

2. Description of the Related Art

Double clutch assemblies of this type are used, for example, in conjunction with variable gear transmissions which have two transmission input shafts. Different gear stages can be engaged, depending on which of the transmission input shafts is in the torque-transmitting path after actuation of the associated clutch area. To implement the engagements and disengagements of the clutch, it is known in double clutch assemblies of this type that each clutch area can have its own, separate engaging/disengaging mechanism, so that, depending on the actuation or activation of one of the engaging/disengaging mechanisms, one of the clutch areas can be disengaged while the other is or becomes engaged. This leads to a relatively complicated design, however, because the two engaging/disengaging mechanisms, such as engaging/disengaging piston-cylinder assemblies, must be installed in a small space and thus staggered radially, for example, with respect to each other.

SUMMARY OF THE INVENTION

The object of the present invention is to improve the double clutch assembly of the general type in question so that, with a simpler design for executing engagements and disengagements, the various clutch areas can be activated in a simplified manner.

This object is accomplished according to the invention by a double clutch assembly, comprising a first clutch area for the optional production of a torque-transmitting connection between a drive element and a first driven element and a second clutch area for the optional production of a torque-transmitting connection between the drive element and a second driven element.

The double clutch assembly according to the invention has a common engaging/disengaging mechanism, by means of which the first and the second clutch areas can be actuated to produce or to nullify the torque-transmitting condition.

According to the invention, therefore, the principle of providing a separate engaging/disengaging mechanism for each clutch area, these separate mechanisms then also being actuated separately, is abandoned. Instead, a single mechanism of this type is provided, which, depending on how it is actuated, can have the effect either of engaging one of the clutch areas while disengaging the other or of keeping both clutch areas in a state of partial torque transmission. This considerably simplifies both the design of a clutch assembly of this type and the measures required to actuate the clutch.

In accordance with the invention, it is then also provided preferably that, when one of the clutch areas has been actuated by the engaging/disengaging mechanism to produce the torque-transmitting condition, the other clutch area is actuated to nullify the torque-transmitting condition.

In the double clutch assembly according to the invention, a force storage element can be provided, by means of which at least one of the clutch areas is or can be held under pretension in its torque-transmitting condition.

For the execution of engaging and disengaging operations of the various clutch areas, furthermore, a force-generating mechanism is preferably provided to generate an actuating force, by means of which at least one of the clutch areas can be brought into its torque-transmitting condition.

To minimize the effort required to actuate the force-generating mechanism, it is proposed that, by means of the force-storage element, one of the clutch areas is pretensioned in its torque-transmitting condition, and that, by means of the force-generating mechanism, the force-storage element can be moved to nullify the torque-transmitting condition of the one clutch area while producing the torque-transmitting condition of the other clutch area. The clutch assembly is thus always kept under pretension by the force-storage element in such a way that one of the clutch areas is engaged, whereas, in order to engage the other clutch area, the force-generating mechanism must be energized.

In another advantageous embodiment of the invention, it can be provided that the force-storage element is a bistable force-storage element, that the force-storage element can be switched from one of its stable states to the other by the force-generating mechanism, and that, in each of the two stable states, one of the clutch areas is held under pretension in its torque-transmitting condition by the force-storage element. In this variant, either one of the clutch areas can be held under pretension in its engaged position by the force-storage element when the force-storage element, under the action of the force-generating mechanism, is brought into the appropriate stable position.

In another, alternative design variant, a force-transmitting lever assembly can be provided, by means of which the actuating force can be transmitted from the force-generating mechanism to the first clutch area and the second clutch area.

The first clutch area preferably has a first friction surface, which can be brought to rest against a first clutch disk assembly; the second clutch area has a first friction surface which can be brought to rest against a second clutch disk; and an intermediate disk assembly with a second friction surface for the first clutch area and a second friction surface for the second clutch area is provided for the first and second clutch areas.

In order to produce the torque-transmitting condition of one of the clutch areas and to nullify the torque-transmitting condition of the other clutch area in the case where the second friction surfaces of the first and second clutch areas are essentially fixed, and to switch easily from one of the two clutch areas to the other, the first friction surface of the one clutch area can be moved toward the second friction surface of the one clutch area, and the first friction surface of the other clutch area can be moved away from the second friction surface of this other clutch area. It is then advantageous in this case for a component carrying the first friction surface of the first clutch area and a component carrying the first friction surface of the second clutch area to be connected to the engaging/disengaging mechanism for movement with respect to the associated second friction surfaces.

As an alternative to produce the torque-transmitting condition of one of the clutch areas and to nullify the torque-transmitting condition of the other clutch area in the case where the friction surfaces of the first and second clutch areas are essentially fixed, and to easily produce or nullify the torque-transmitting condition, the second friction surface of the one clutch area can be moved toward the first friction surface of the one clutch area, while the second friction surface of the other clutch area can be moved away from the first friction surface of the other clutch area.

To minimize any change in the operating characteristic of the double clutch assembly even after prolonged periods of operation, the double clutch assembly according to the invention preferably also has a wear compensation assembly to compensate for the wear which occurs in the first clutch area and/or in the second clutch area.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
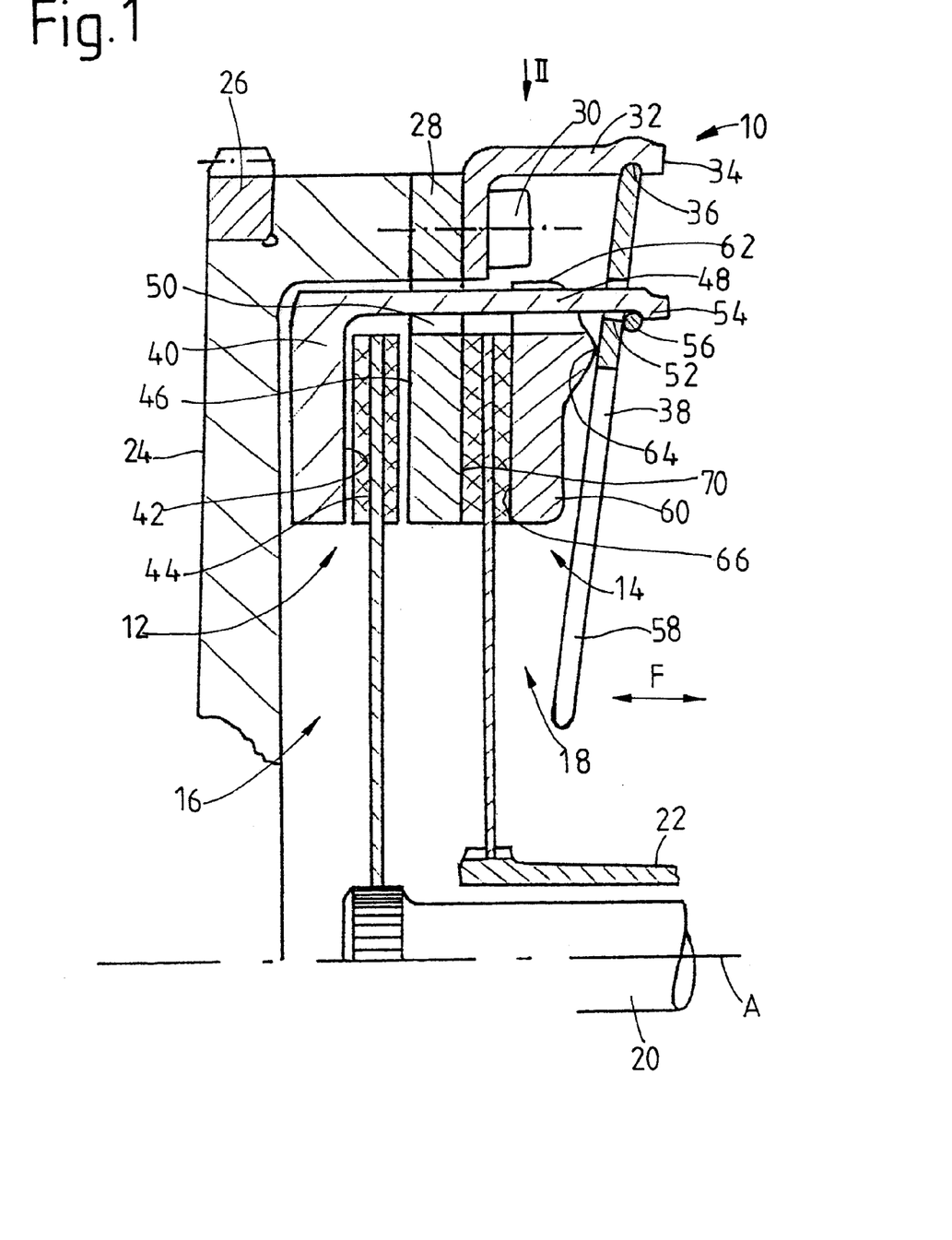
FIG. 1 shows a partial, longitudinal cross section through a first embodiment of a double clutch assembly according to the invention.

A first design variant of a double clutch assembly 10 according to the invention is shown in FIG. 1. The double clutch assembly 10 comprises two clutch areas 12, 14, which can be engaged and disengaged in alternation and as desired for the purpose of transmitting torque. The first clutch area 12 has a clutch disk 16, and second clutch area 14 has a clutch disk 18. Each of the two clutch disks 16, 18 is connected to its own take-off element 20, 22, such as transmission input shafts, positioned coaxially to each other, so that each disk can rotate in common with its shaft.

The double clutch assembly 10 also comprises a flywheel 24, designed in the form of a cup, for example, which is permanently connected to a drive shaft (not shown), possibly a crankshaft, for rotation in common around a rotational axis A. The flywheel 24 can carry a starter gear ring 26 on the radially outside edge. On its open end, the flywheel 24 carries an intermediate disk element 28, which is fixed in position on the flywheel 24 by a plurality of threaded bolts 30 or the like. The threaded bolts 30 also establish a permanent connection between a force-storage element carrier 32, the flywheel 24, and the intermediate disk element 28. The force-storage carrier 32 can also be designed as a cup with an open bottom, or it can be designed with several axial arm sections 34, each of which is provided with a recess 36 in the axial end, formed by rolling or by some other suitable process. The radially outer circumferential area of a force-storage element 38, designed as, for example, a diaphragm spring or cup spring, is inserted in recess 36 so that it is held firmly in place.

The first clutch area 12 has a first pressure plate 40, which has a first friction surface 42 on the axial side facing the intermediate disk element 28; this first friction surface works together with the friction linings 44 of the first clutch disk 16. In corresponding fashion, the intermediate disk element 28 has a second friction surface 46 of the first clutch area 12 on the side facing the first pressure plate 40. The pressure plate 40 has a plurality of axial connecting arms 48, which pass through appropriate openings 50 in the intermediate disk element 28 and also through appropriate openings 52 in the force-storage element 38. By means of a deformation process such as rolling or the like, the terminal parts 54 of the connecting arm sections 48 projecting axially beyond the force-storage element 38 are provided with an undercut, in which a radially outward-pretensioned wire ring 56 is seated. In this way, the first pressure plate 40 is connected to the force-storage element 38 with respect to axial movement; that is, when the force-storage element 38, as shown in FIG. 1, is pulled by its inner terminal part 58 away from the flywheel 24, it takes the pressure plate 40 along with it. It should be pointed out that the first pressure plate 40 can be connected to the intermediate disk element 28 or to the flywheel 24 by, for example, tangential leaf springs (not shown) or the like for rotation in common with the intermediate disk element or flywheel while remaining free to move in the axial direction.

The second clutch area 14 also has a pressure plate 60, which, for example, is connected in an essentially nonrotatable manner but with freedom of axial movement to the intermediate disk element 28 or to the flywheel 24 by tangential leaf springs, etc. In the radially outer area, the second pressure plate 60 has open areas 62, through which the connecting arm sections 48 of the first pressure plate 40 can extend axially. The pressure plate 60 also has a contact or ridge area 64, on which the radially central area of the force-storage element 38 can rest. It should also be pointed out that the second pressure plate 60 has a first friction surface 66 for contact with the friction linings 68 of the second clutch disk 18 and, in a corresponding manner, the intermediate disk element 28 has a second friction surface 70 for the clutch disk 18 of the second clutch area 14.

The way in which the double clutch assembly 10 shown in FIG. 1 functions is described in the following. In FIG. 1, a stable position of the force-storage element 38 is shown, in which this element is pressing the second pressure plate 60 onto the second clutch disk 18 and thus holds the second clutch area 14 in its torque-transmitting position. The first pressure plate 40 has been lifted off the first clutch disk 16 by, for example, the pretensioning force of tangential leaf springs, etc., so that the first clutch area 12 is held in its disengaged position. When now, as a result of a force-generating mechanism, indicated by a force arrow F, a force is exerted on the inner end 58 of the force-storage element 38 in the direction away from the flywheel 24, this element is brought into an increasingly flattened and thus unstable position. The two pressure plates 40, 60 follow along with this movement; the first pressure plate 40 is pulled via its connecting arms sections 48, whereas the second pressure plate 60 is lifted by, for example, the pretensioning force of tangential leaf springs, etc., from the second clutch disk 18. As the force-storage element 38 continues to travel in the same direction, the first pressure plate 40 eventually arrives in a position in which it is pressing the first clutch disk 16 against the intermediate disk element 28, which thus brings the first clutch area 12 into its torque-transmitting condition, whereas the second clutch area 14 is brought into a condition in which it is no longer able to transmit any torque. This continued travel of the force-storage element 38 can be caused by the continued generation of actuating force by the force-generating mechanism, but it can also be induced by the transition of the force-storage element 38 into a second stable position, in which it forms a cone slanting in the direction exactly opposite that shown in FIG. 1 with respect to a plane perpendicular to the rotational axis A. The force-generating mechanism now has merely the function of giving the initial impulse which causes the force-storage element to snap into its opposite state, i.e., of converting it in the manner described into the stable condition in question at the time.

It should be pointed out that, during the course of a switchover process such as this, a position is preferably assumed in which neither of the two clutch areas 12, 14 is fully engaged for torque transmission. That is, either the two clutch areas 12, 14 are slipping, or the two clutch areas 12, 14 are in a condition in which they cannot transmit any torque at all.

It should also be pointed out that the force-generating mechanism can be of any suitable design. It can be, for example, an electrical actuator, but the force for actuating the force-storage element 38 can obviously also be applied by hydraulic or pneumatic means.

Figure 2:
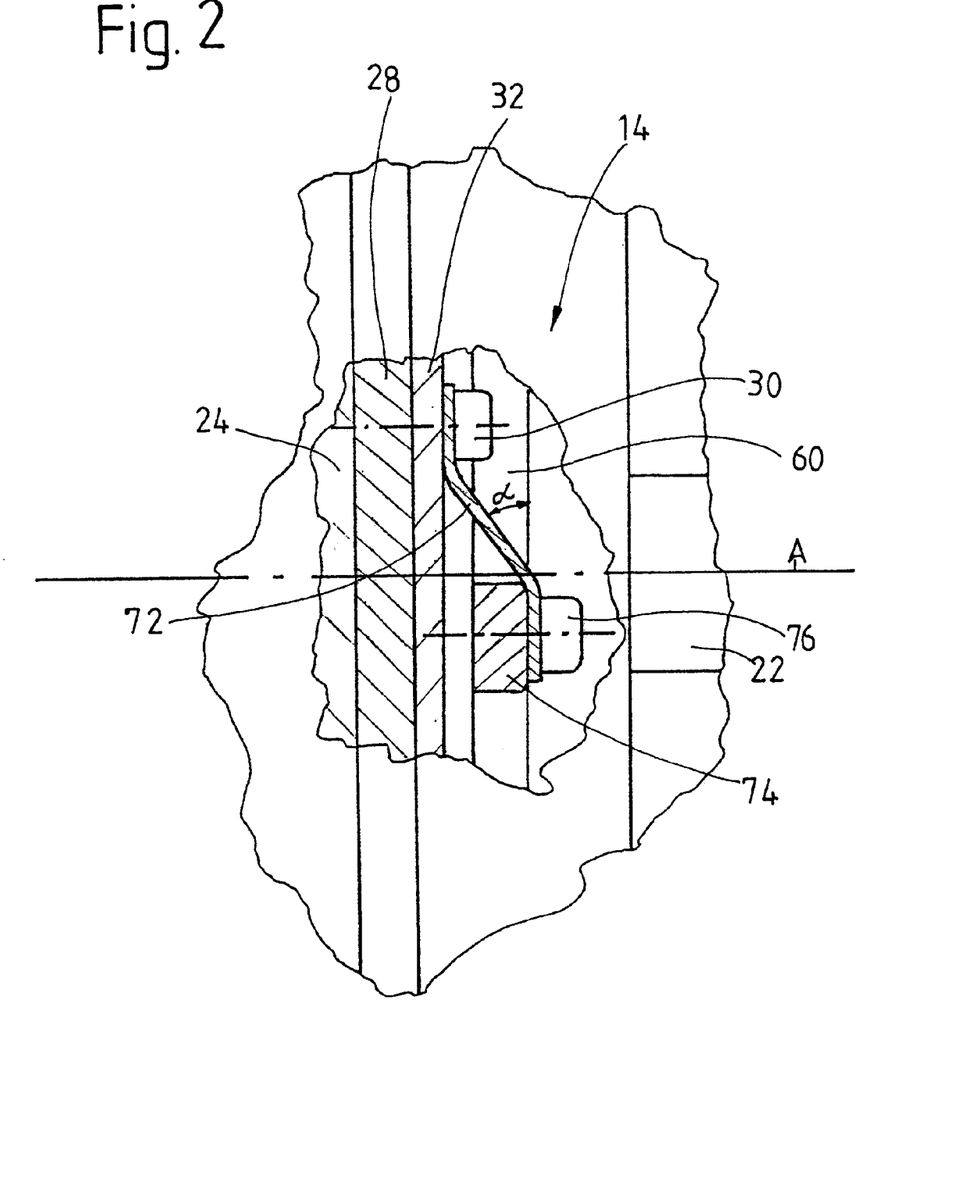
FIG. 2 shows a view of the assembly of FIG. 1 in direction II of FIG. 1.

FIG. 2 shows a possible way in which the pressure plate 60, and correspondingly the pressure plate 40, can be prevented from rotating with respect to the flywheel 24 or the intermediate disk element 28. It can be seen that the threaded bolts 30 also fix one end of the tangential leaf springs 72 in position with respect to the flywheel 24. The tangential leaf springs extend toward radially outward-projecting sections 74 of the pressure plate 60, thus forming an angle to a plane orthogonal to the rotational axis A, and are held in position on this plate by threaded bolts 76 or the like. When the pressure plate 60 is moved toward the intermediate disk element 28 to clamp the friction linings 68 of the clutch disk 18, then, in "pull" mode (when the flywheel 24 and the pressure plate 60 are moved upward for example, in the illustration according to FIG. 2, in which we are looking in the radial direction from the outside), a frictional braking force is exerted on the pressure plate 60, thus slowing it down. As a result of the slanted tangential leaf springs, this delaying force has a component which is normal to the friction linings 68 of the clutch disk 18 and directed toward them so that a self-reinforcing frictional force effect occurs in this clutch area 14.

Figure 3:
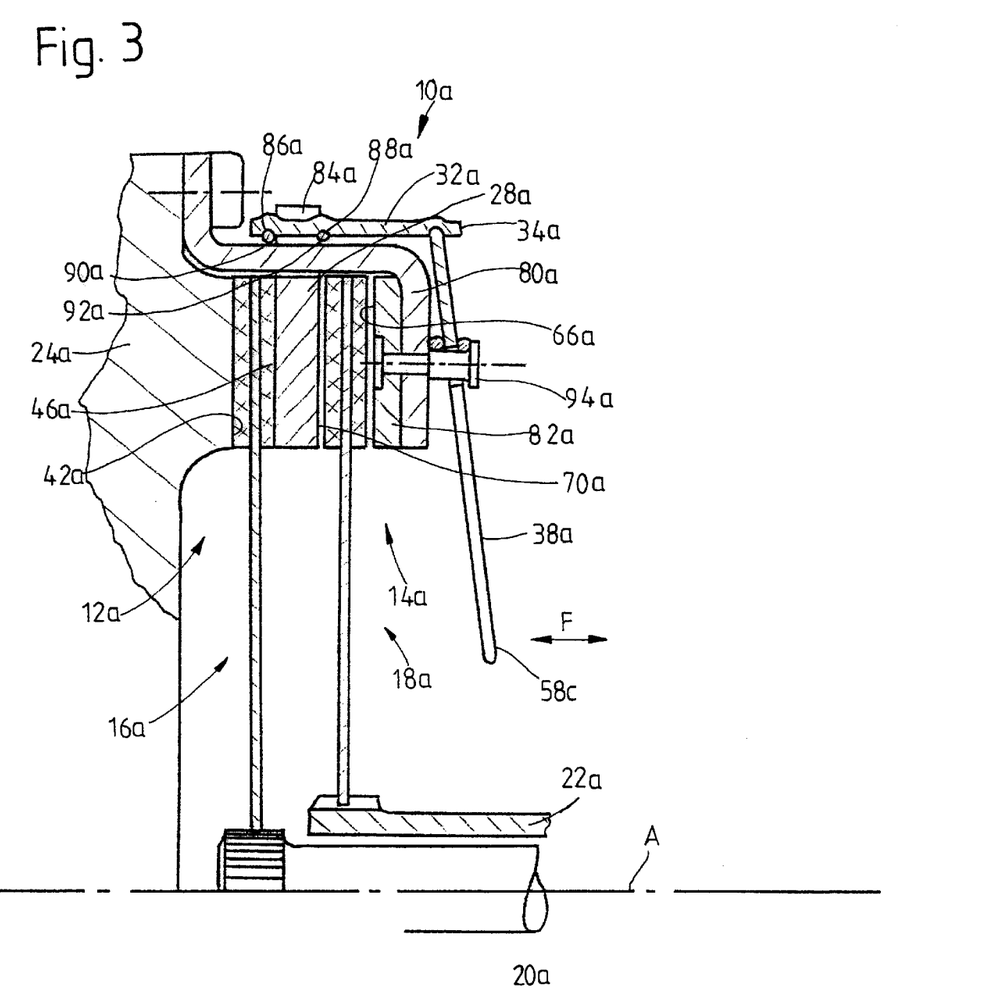
FIG. 3 shows a view, corresponding to that of FIG. 1, of an alternative design for the double clutch assembly according to the invention.

FIG. 3 shows an alternative design for a double clutch assembly according to the invention. Components which correspond to those described above with respect to their design or function are designated by the same reference numbers with an added letter "a".

It can be seen in FIG. 3 that, on the flywheel 24a, a housing 80a is now attached around the radially outside edge. The surface area 42a of the flywheel 24a now forms the first friction surface of the first clutch area 12a. In a corresponding manner, a friction surface component 82a is attached to housing 80a. The surface of this component which faces the flywheel 24a forms the first friction surface 66a of the clutch area 14a. The intermediate disk element 28a is free to move in the axial direction, and its arm sections 84a pass through slot-like holes in the housing 80a. The force-storage carrier 32a is designed as a sleeve and also has pass-through openings for the arm sections 84a in the form of slot-like holes, for example. At both axial ends of these pass-through openings are pleat-like depressions 86a, 88a, into which radially outward-pretensioned wire rings 90a, 92a fit in order to hold the intermediate disk element 28a axially in place with respect to the force-storage element carrier 32a.

The force-storage element 38a is now supported with freedom to pivot by spacer bolts 94a or the like on the outside surface of the housing 80a, that is, on the side of the housing facing away from the flywheel 24a. The pivoting movement of the force-storage element 38a has the effect of shifting the force-storage carrier 32a in the axial direction, which also means that the intermediate disk element 28a is pushed in the axial direction as well. Let us assume again by way of example that the force-storage element 38a is basically pretensioned in the stable position shown in FIG. 3, as a result of which the first clutch area 12a is held in its engaged condition. As the result of a force coming from the force-generating mechanism and acting on the radially inner area 58a, the force-storage element 38a can be brought into an unstable position, in which neither of the two clutch areas 12a, 14a is in a torque-transmitting condition at first, and then, as this movement continues, into a second stable position, in which the second clutch area 14a is now held in its engaged condition.

Figure 4:
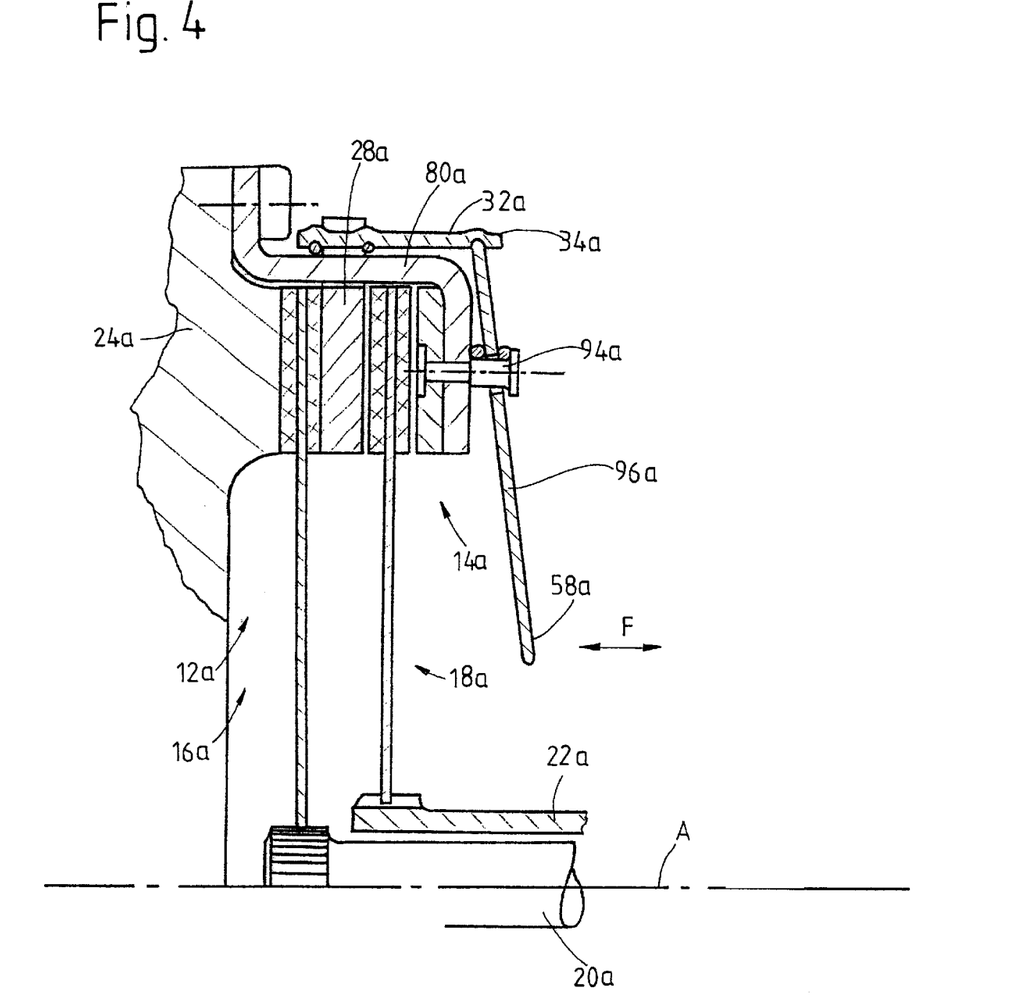
FIG. 4 shows another view, corresponding to that of FIG. 1, of an alternative design for the double clutch assembly according to the invention.

FIG. 4 shows a modification of this design variant. Here there is no force-storage element here but rather a plurality of force-transmitting levers 96a, distributed around the circumference, which fit into the previously described carrier 32a. The force-transmitting levers 96a, like the previously described force-storage element, are supported on the outside surface of the housing 80a so that they are free to pivot. A force acting on the radially inner ends 58a of these force-transmitting levers 96a leads to the axial displacement of the intermediate disk element 28a and thus to the changeover from the one to the other of the two clutch areas 12a, 14a.

Figure 5:
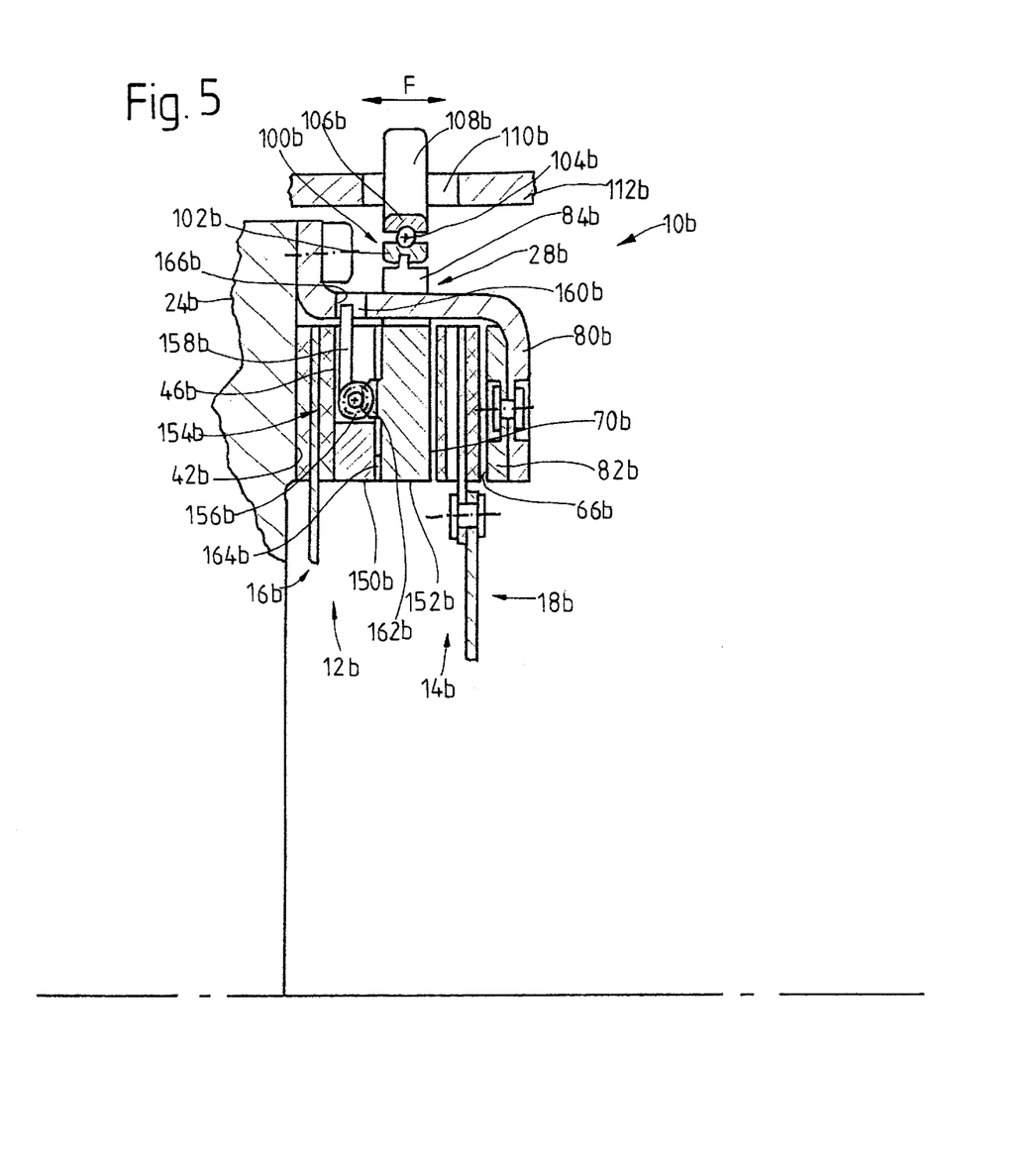
FIG. 5 shows another view, corresponding to that of FIG. 1, of an alternative design of the double clutch assembly according to the invention.

Another alternative design for a double clutch assembly according to the invention is shown in FIG. 5. Components which correspond to those previously described with respect to design or function carry the same reference numbers as those components with the addition of a "b".

With respect to the essential parts, the design shown in FIG. 5 is the same as that described above on the basis of FIGS. 3 and 4. Only the differences in the design will therefore be discussed below.

It can be seen in FIG. 5 that the intermediate disk element 28b is now permanently connected by its arm sections 84b to a bearing 100b, such as to the inner ring 102b of a bearing, which surrounds the housing 80b radially on the outside. An outer bearing ring 106b, which is free to rotate with respect to the inner bearing ring on several rolling elements such as balls 104b, is permanently connected to or designed as an integral part of a radially projecting force-transmitting element 108b, which passes through an opening 110b in a clutch bell, or the like, designated in general as 112b. The force-generating mechanism, which is indicated here again by the force arrow F, can thus exert a force on the force-transmitting element 108b, which in turn brings about the axial displacement of the intermediate disk element 28b and the changeover from one of the clutch areas 12b, 14b to the other. The actuating force-generating mechanism device can be, for example, a hydraulic drive, an electric motor, or the like.

We can also see in FIG. 5 that the intermediate disk element 28b is made up of a number of parts, as will be described in the following, so that wear can be compensated. As can be seen from FIG. 5, the intermediate disk element 28b is divided essentially in two, comprising two disk parts 150b, 152b. Between these disk parts, a wear compensation assembly 154b plays its role. This assembly includes at least one worm 156b on disk part 150b, this worm being free to rotate around an axis which extends approximately in the circumferential direction or tangentially thereto. The worm 156b is permanently connected to a drive lever 158b. The drive lever 158b extends radially toward the outside and passes through an opening 160b in the housing 80b. The worm 156b meshes with gear teeth 162b, which, extending in the circumferential direction, are provided on the disk part 152b. The worm 156b and the gear teeth 162b represent a self-locking gear transmission. The two disk parts 150b, 152b rest against each other via ramp segments 164b, which extend in the circumferential direction. This means that each disk part 150b, 152b is provided with ramp segments of this type, extending around their circumferences, each segment of one disk part facing a corresponding ramp segment on the other disk part in the axial direction. Upon relative rotation between the two disk parts 150b, 152b, their contacting ramp surfaces slide along each other, with the result that the total axial dimension of the unit formed by the two disk parts 150b, 152b can be changed.

When the friction linings of the clutch disk 16b are worn down during operation, with the result that the clutch disk 16b becomes thinner in the axial direction in the area of its friction linings, the intermediate disk element 28b moves increasingly closer to the flywheel 24b. When ultimately the drive lever 158b, which is permanently connected to the worm 156b or is attached in some way which allows it to rotate the worm, hits the edge 166b of the opening 106b near the flywheel 24b, the worm is caused to rotate; and because the worm meshes with the gear teeth 162b, this rotation of the worm causes the disk part 152b to rotate around axis A with respect to disk part 150b. Thus the slanted surfaces or ramps 164b mentioned above on the two disk parts 150b, 152b slide along each other, namely, in the direction such that the total axial dimension of the two disk parts 150b, 152b, i.e., of the assembly formed by them, is increased. Thus the wear which has occurred in the area of the clutch disk 16b can be compensated.

In regard to the location and size of the opening 160b, care must be taken to ensure that, when the clutch area 14b engages, the drive lever 158b does not strike the edge farther away from the flywheel 24b, because this could cause the wear compensation assembly 154b to return to its original state.

It should be pointed out here that a corresponding assembly could also be provided in conjunction with the second clutch area 14b, so that ultimately the intermediate disk element 28b would comprise three disk parts. In this case, corresponding worms or drive mechanisms would be provided on the two axially outer disk parts, and the disk part 152b would carry gear teeth on both axial sides, with which the worms could mesh.

Figure 6:
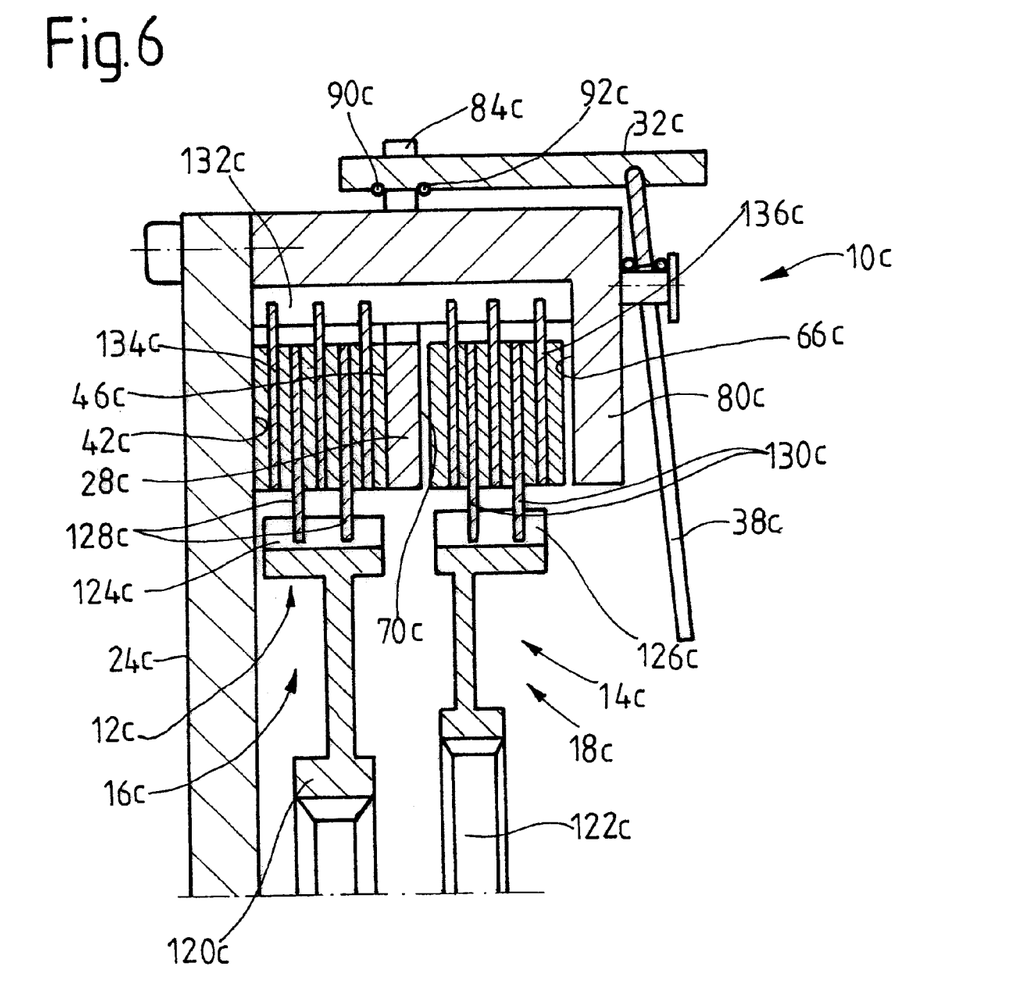
FIG. 6 shows another view, corresponding to that of FIG. 1, of a double clutch assembly according to the invention which is designed as a wet-running clutch.
Figure 7:
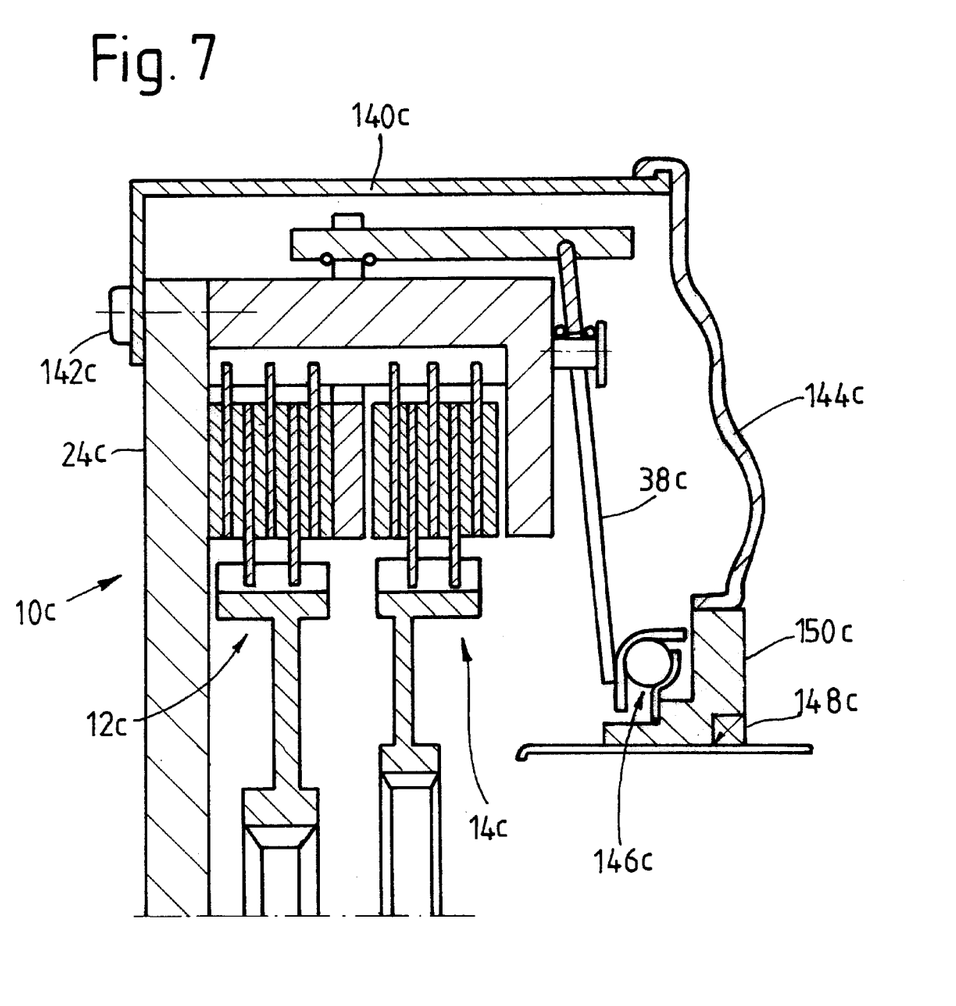
FIG. 7 shows the clutch according to FIG. 6 together with a housing, which seals the clutch off from the outside.

Another variant of the double clutch assembly according to the invention is illustrated in FIGS. 6 and 7. Components which correspond to those described previously with respect to design or function have been given the same reference numbers with the addition of a "c".

In terms of its function, the double clutch assembly 10c shown in FIGS. 6 and 7 corresponds basically to the design variant shown in FIG. 3. In particular, the force storage element 38c has two stable positions. The essential difference is that the clutch here is of the wet-running type and has internal plate carriers 120c, 122c serving as the clutch disks 16c, 18c. These carriers can be connected to the two take-off shafts (not shown) for rotation in common. These two internal plate carriers 120c, 122c have gear teeth-like configurations 124c, 126c on their outer circumferential areas, in which the internal plates 128c, 130c of a matching configuration can engage in such a way that they are connected nonrotatably but with freedom of axial movement to the internal plate carriers 120c, 122c.

In a corresponding manner, the housing 80c now has a toothed or driving configuration 132c, in which the external plates 134c or 136c of clutch area 12c or clutch area 14c engage in such a way that they are connected nonrotatably to the housing 80c but are free to move in the axial direction. The internal plates 128c, 130c and/or the external plates 132c, 136c carry friction linings, which, in the engaged state of the respective clutch area 12c, 14c, are thus able to engage frictionally with each other. The friction linings which come last in the two axial directions are able to rest against the first friction surface 42c and the second friction surface 46c of the first clutch area 12c; or, in the case of the second clutch area 14c, they can rest against the first friction surface 66c and the second friction surface 70c.

In FIG. 7, it can be seen that the clutch assembly 10c is surrounded on the radially outward side by an enclosure housing 140c, which, for example, is bolted to the flywheel 24c by threaded bolts 142c and sealed off axially by way of an elastic cover element 144c in the area of the force-storage element 38c, this elastic cover 144c extending in the radially inward direction all the way to a clutch release bearing 146c, across which an actuating force can be transmitted to the force-storage element 38c. A thrust element 150c, which is sealed off with respect to a transmission housing or one of the drive shafts by a sealing element 148c, can be actuated by the force-generating mechanism to actuate the force-storage element 38c and thus to switch from one of the two clutch areas 12c, 14c to the other.

It should be pointed out that, in all of the design variants described above, a wide variety of changes are possible. Thus, for example, the flywheel can be built in general as a dual-mass or multi-mass flywheel in order to provide rotational vibration damping even before any torque is applied to the clutch assembly. In the area of the clutch disks, furthermore, it is also possible to install rotational vibration damping devices in a manner known in and of itself. It is also possible to combine the clutch assembly with a crankshaft-starter-generator system, which, in addition to the function of starting a drive system, can also contribute actively to vibration damping. In principle, it is also possible to design the individual friction surfaces not with normal vectors parallel to the axial direction but rather at a certain angle to the axial direction, that is, to design them with a conical contour. The two clutch areas, furthermore, could also be provided with different diameters, so that the clutch area with the larger diameter could be used, for example, as the start-up clutch, whereas the other clutch area would be used for gear-changing while driving. It is also possible to provide lining springs in the area of the clutch disks or plates.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A double clutch assembly comprising:
   an intermediate disk assembly;
   a first clutch area for the production of a first torque-transmitting connection between a drive element and a first driven element, said first clutch area comprising a first pressure plate, a first clutch disk assembly located between said first pressure plate and said intermediate disk assembly, the first pressure plate being movable toward the intermediate disk assembly to produce the first torque-transmitting connection;
   a second clutch area for the production of a second torque-transmitting connection between the drive element and a second driven element, said second clutch area comprising a second pressure plate, a second clutch disk assembly located between said second pressure plate and said intermediate disk assembly, which is located between said first and second clutch areas, the second pressure plate being movable toward the intermediate disk assembly to produce the second torque-transmitting connection; and
   a common engaging/disengaging mechanism which actuates one of said first and second clutch areas to produce one of said first and second torque-transmitting connections while it actuates the other of said first and second clutch areas to nullify the other of said first and second torque-transmitting connections.

2. Double clutch assembly according to claim 1 further comprising a force-transmitting lever assembly which transmits an actuating force to said first clutch area and to said second clutch area.

3. A double clutch assembly according to claim 1 wherein said intermediate disk assembly is essentially fixed, either one of said pressure plates being movable toward said intermediate disk assembly to produce the respective torque-transmitting connection, and further comprising a force-transmitting lever assembly which transmits an actuating force to said first clutch area and to said second clutch area.

4. A double clutch assembly according to claim 3 wherein said first pressure plate and said second pressure plate are connected to the engaging/disengaging mechanism so that they can be moved with respect to the intermediate disk.

5. A double clutch assembly as in claim 1 wherein said pressure plates are essentially fixed, said intermediate disk assembly being movable toward either one of said pressure plates to produce the respective torque transmitting connection.

6. A double clutch assembly as in claim 1 wherein at least one of said first and second clutch areas comprises a wear compensation assembly which compensates for wear occurring in the at least one clutch area.

7. A double clutch assembly comprising
   a first clutch area for the production of a first torque-transmitting connection between a drive element and a first driven element,
   a second clutch area for the production of a second torque-transmitting connection between the drive element and a second driven element,
   a common engaging/disengaging mechanism for actuating said first and second clutch areas to produce and to nullify the first and second torque transmitting connections, and
   a force-storage element which is movable in response to an actuating force to pretension either one of said first and second clutch areas to maintain a respective one of said first and second torque-transmitting connections, said force storage element being movable to actuate one of said first and second clutch areas to produce one of said first and second torque-transmitting connections while it actuates the other of said first and second clutch areas to nullify the other of said first and second torque-transmitting connections,
   wherein said force storage element is a bistable force storage element which can be switched between two stable states by an actuating force, a respective one of said first and second clutch areas being pretensioned by said force storage element to produce one of said first and second torque-transmitting connections in each of said stable states.

8. Double clutch assembly according to claim 7 further comprising a force-transmitting lever assembly which transmits an actuating force to said first clutch area and to said second clutch area.

9. A double clutch assembly as in claim 7 further comprising an intermediate disk assembly between said first and second clutch areas,
   said first clutch area comprising a first pressure plate, a first clutch disk assembly located between said first pressure plate and said intermediate disk assembly, the first pressure plate being movable toward the intermediate disk assembly to produce the first torque-transmitting connection,
   said second clutch area comprising a second pressure plate, a second clutch disk assembly located between said second pressure plate and said intermediate disk assembly, the second pressure plate being movable toward the intermediate disk assembly to produce the second torque-transmitting connection.

10. A double clutch assembly according to claim 9 wherein said intermediate disk assembly is essentially fixed, either one of said pressure plates being movable toward said intermediate disk to produce the respective torque-transmitting connection, and further comprising a force-transmitting lever assembly which transmits an actuating force to said first clutch area and to said second clutch area.

11. A double clutch assembly according to claim 10 wherein said first pressure plate and said second pressure plate are connected to the engaging/disengaging mechanism so that they can be moved with respect to the intermediate disk.

12. A double clutch assembly as in claim 9 wherein said pressure plates are essentially fixed, said intermediate disk being movable toward either one of said pressure plates to produce the respective torque transmitting connection.

13. A double clutch assembly comprising
    an intermediate disk assembly,
    a first clutch area for the production of a first torque-transmitting connection between a drive element and a first driven element, said first clutch area comprising a first pressure plate and a first clutch disk assembly located between said first pressure plate and said intermediate disk assembly, the first pressure plate being movable toward the intermediate disk assembly to produce the first torque-transmitting connection, a second clutch area for the production of a second torque-transmitting connection between the drive element and a second driven element, said second clutch area comprising a second pressure plate and a second clutch disk assembly located between said second pressure plate and said intermediate disk assembly, the second pressure plate being movable toward the intermediate disk assembly to produce the second torque-transmitting connection, and a common engaging/disengaging mechanism for actuating said first and second clutch areas to produce and to nullify the first and second torque transmitting connections.

14. A double clutch assembly according to claim 13, wherein said intermediate disk assembly is essentially fixed, either one of said pressure plates being movable toward said intermediate disk to produce the respective torque-transmitting connection, and further comprising a force-transmitting lever assembly which transmits an actuating force said first clutch area and to said second clutch area.

15. A double clutch assembly according to claim 14 wherein said first pressure plate and said second pressure plate are connected to the engaging/disengaging mechanism so that they can be moved with respect to the intermediate disk.

16. A double clutch assembly as in claim 13 wherein said pressure plates are essentially fixed, said intermediate disk being movable toward either one of said pressure plates to produce the respective torque transmitting connection.

* * * * *